United States Patent [19]
Redus et al.

[11] Patent Number: 5,421,209
[45] Date of Patent: Jun. 6, 1995

[54] MEASUREMENT OF STEAM QUALITY AND MASS FLOW RATE

[75] Inventors: Clifford L. Redus, Aberdeen, Scotland; James W. Scott, Katy, Tex.; Sze-Foo Chien; Peter L. Sigwardt, both of Houston, Tex.

[73] Assignee: Texaco Inc., White Plains, N.Y.

[21] Appl. No.: 97,690

[22] Filed: Jul. 23, 1993

Related U.S. Application Data

[63] Continuation of Ser. No. 995,902, Dec. 22, 1992, abandoned, which is a continuation of Ser. No. 699,048, May 13, 1991, abandoned.

[51] Int. Cl.$^6$ .............................................. G01F 1/74
[52] U.S. Cl. .................................. 73/861.04; 73/29.03
[58] Field of Search ............... 73/29.01, 29.03, 861.04, 73/195

[56] References Cited

U.S. PATENT DOCUMENTS

| | | | |
|---|---|---|---|
| 4,576,043 | 3/1986 | Nguyen | 73/861.04 X |
| 4,836,032 | 6/1989 | Redus et al. | 73/29.01 |
| 5,092,159 | 3/1992 | Chien | 73/29.03 |

*Primary Examiner*—Herbert Goldstein
*Attorney, Agent, or Firm*—James L. Bailey; Kenneth R. Priem; William J. Beard

[57] ABSTRACT

Apparatus and method for concurrently determining steam flow rate and quality, through a conduit which comprises an orifice plate positioned in series with a critical flow venturi in said conduit. Pressure sensing means in the conduit senses pressures therein for application in a formula to provide the desired steam values and provide a method for determining both the quality and the mass flow rate of steam flow passing through the conduit. The measurements are of particular value in the instance of steam flow where a minimal decrease in steam pressure across the measuring instrument is a relevant factor.

3 Claims, 1 Drawing Sheet

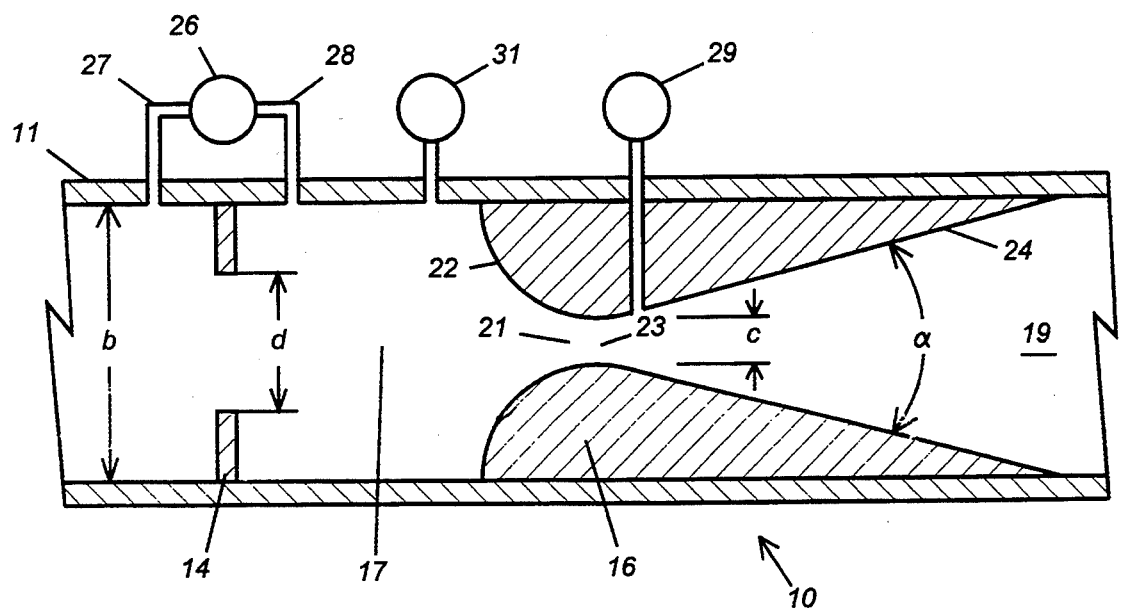

MEASUREMENT OF STEAM QUALITY AND MASS FLOW RATE

CROSS REFERENCE TO RELATED PATENT APPLICATIONS

This patent application is a continuation of application Ser. No. 07/995,902 which was filed Dec. 22, 1992, and now is abandoned, and which was in turn a continuation of application Ser. No. 07/699,048, filed May 13, 1991, and now abandoned.

BACKGROUND OF THE INVENTION

Field of the Invention

The quality and mass flow rate of wet steam through a pipeline or conduit are characteristics which are not readily determined with a high degree of accuracy. Many commercial instruments and forms of apparatus are capable of furnishing an analysis of steam quality and mass flow rate. This equipment, however, normally embodies a deterrent toward accuracy of measurement.

It has been determined as a commercial reality that the accurate measurement of steam characteristics such as flow and quality can be accomplished through the facility of a variety of different instruments or combination of instruments. However, when the steam measurement provides a satisfactory answer, but will constitute an adverse affect to the ultimate use of the steam, the procedure is usually not acceptable.

For example, steam rate of flow over into a large scale production such as injection into a subterranean crude oil holding reservoir, production can be successfully accomplished through the use of instrumentation involving a critical flow choke and an orifice plate. This is illustrated in U.S. Pat. No. 4,836,032 (Redus, et al.) wherein the disclosed steam measuring system provides means for initially passing the steam flow through an orifice, and thereafter, through an elongated critical flow choke. The resulting measurable characteristics of the steam will allow an accurate calculation of both the steam flow rate and its quality. This system, however, falls short of practicality in regard to the ultimate steam pressure, a factor prompted by the characteristics of the patentees' critical choke which automatically reduces the downstream pressure of the steam by about 50% from the upstream pressure.

In a similar steam measuring application of the prior art, U.S. Pat. No. 4,576,043 (Nguyek), the patentee utilizes the combination of an orifice plate positioned upstream of a venturi to determine one or more flow rate parameters of a two phase flow. This two phase flow introduces a condition that does not equate it with other comparable steam flow conditions as where a critical steam flow is required by the measuring instrument. More particularly, two phase flow cannot be equated to the type of flow presently under consideration is steam at critical flow conditions.

One such steam monitoring and measuring instrument is disclosed in U.S. Pat. No. 4,836,032, dated Jun. 6, 1988. In the disclosed apparatus, the patentees provide a method and apparatus for measurement of wet steam quality and mass flow rate. This is achieved by passing the wet steam through a conduit in which an orifice plate is disposed axially upstream of a constant bore diameter critical flow choke.

In summary, a primary fault inherent to an arrangement disclosed by Redus, et al., resides in the relatively large decrease in steam pressure realized at the downstream side of the measuring instrument. This pressure loss, when considered for high volume usage, can achieve an order of magnitude of 50% of the pressure at the measuring apparatus inlet. The loss is attributable at least in part to the nature of the patentees use of a critical choke which is characterized by a constant diameter flow passage.

An exaggerated pressure loss of this magnitude can be readily tolerated in many instances and applications. However, where the steam flow is delivered to a point of downstream use after being so monitored, a severe pressure drop across the measuring instrument could constitute a detriment. Further, the lower resulting pressure might preclude use of an instrument or equipment that could otherwise be utilized.

BSI toward obtaining an instrument or apparatus for more accurately monitoring and measuring a pressurized steam flow through a conduit or the like without realizing a substantial pressure loss, the present combination is provide. The novel apparatus includes primarily a conductor, preferably round in cross-section, such as a conduit, pipe, tubing or the like which defines a main steam flow passage.

The main stream flow passage is communicated with a pressurized source of the steam. The latter normally includes necessary valving that allows a regulated flow of the steam within a desired pressure range, to be delivered downstream of the measuring instrument.

The steam conduit is provided with a transversely positioned plate having a constricted, orifice opening therethrough. The orifice plate is located upstream of, and spaced from a critical flow venturi defining a chamber therebetween.

A multi-segment, or composite flow passage extending through the critical flow venturi includes an inlet or upstream segment defined by a progressively narrowing cross-section or progressively converging wall segment which terminates at a constricted throat. From the throat, the steam gradually expands along a smooth surfaced, frusto conical wall formed by a constantly diverging cross-section which defines the downstream segment of the venturi composite flow passage.

To monitor varying factors along the steam path, pressure gauges or sensors are communicated with the steam flow passage. A fist gauge or pressure sensing means is positioned across the orifice plate to register pressure differential. A second pressure gauge or sensing means is positioned in communication with the intermediate chamber to constantly sense pressure conditions therein. A third pressure sensor communicates with the constricted throat immediately downstream of the smallest diameter of the latter.

The configuration of the venturi flow passage allows steam flowing along the walls thereof to substantially maintain its pressure prior to being discharged from the passage's discharge or exit port. With the inlet steam pressure known, independent equations for mass flow rate and steam quality can thereafter be solved simultaneously utilizing these pressure factors or values derived from the steam flow measurement.

It is, therefore, an object of this invention to provide a monitoring apparatus capable of providing accurate steam quality and mass flow rate measurements of a pressurized steam flow while maintaining a minimal pressure drop across the measuring apparatus.

BRIEF DESCRIPTION OF THE DRAWING

FIG. 1 illustrates in cross-section a side view of the apparatus.

DETAILED DISCUSSION OF THE PREFERRED EMBODIMENT

Referring to the single FIGURE, a preferred embodiment of the apparatus is illustrated comprising a conduit means 10 having a diameter D, and having an upstream end 11.

Orifice plate 14, positioned transversely of conduit 10, includes a central, sharp-edged orifice opening. A critical flow venturi 16 is positioned downstream of, and spaced from orifice plate 14 a distance to define an intermediate chamber 17 and to form a portion of the steam flow path. The latter is of a sufficient diameter c to assure critical flow of steam in the flow venturi 16. Critical flow venturi 16 embodies an axial, multi-segment passage through which wet steam is guided from intermediate chamber 17 to a discharge port 19.

The critical flow venturi includes an upstream or inlet means 21 which receives the steam flow, and directs the same along a steeply constricting wall 22. Said section is defined by a progressively narrowing cross-section which decreases at a decreasing slope. The latter terminates at a second flow passage segment comprising a constricted throat 23 having a diameter c. The downstream end of throat 23 opens into the flow passage third and main segment. The latter segment is defined within an elongated, uniformly diverging, smooth wall 24 formed with an enclosed angle between about 3° and 10°, for a length "1" of 6 to 10 inches.

Monitoring steam conditions at points along the multi-segment flow passage is achieved through a series of pressure sensing gauges or instruments. A first or differential pressure gauge 26 includes an upstream leg 27 which opens into conduit 10 adjacent the upstream side of orifice plate 14. A second or downstream leg 28 opens into intermediate chamber 17.

Functionally, differential pressure across orifice plate 14, together with the sensed pressure in intermediate chamber 17 at 31, when applied to an empirical formula affords a rapid, accurate determination of the steam's initial quality and mass flow rate.

To determine critical steam flow conditions through the venturi's flow passage, a third pressure gauge 29 is communicated with the multi-segment flow passage at a point approximating a throat diameter d', downstream of the venturi's point of minimal cross-sectional area. The purpose of this pressure measurement is to assure that the steam is in critical flow.

DEVELOPMENT OF CRITICAL VENTURI EQUATION

Development of the empirical formula into which the above noted pressure values, and the conditions of the sensing instrument are taken, the following is prescribed.

The Napier[1] equation for critical flow through an orifice, modified for wet steam by Crocker[2] and King, is $$G^* = \frac{2.057P}{X^{0.5}} \quad (1)$$

where $G^*$ is the critical mass velocity in the venturi, P is the absolute pressure upstream of the venturi, and X is the steam quality immediately upstream of the venturi. This equation has been modified for critical flow through a venturi nozzle and can be expressed as:

$$W = \frac{39.681 c^2 P}{X^{0.408}} \quad (2)$$

where c is the throat diameter and W is the mass flow rate of wet steam. The equation can be generalized for a regression analysis as $$W = \frac{ac^2 P}{X^b} \quad (3)$$

where a and b are empirical constants determined from experimental data.

DEVELOPMENT OF ORIFICE PLATE EQUATION

Equation (3) gives mass flow rate through the venturi as a function of pressure and steam quality upstream of the venturi. Likewise, it becomes necessary to express mass flow rate through the orifice plate as a function of the differential pressure drop across said orifice plate, and steam quality.

The flow of a single phase fluid through a sharp-edged orifice can be expressed as:

$$W = \frac{358.927 C_o d^2 Y F_a}{\sqrt{1 - \left(\frac{d}{D}\right)^4}} \sqrt{\frac{\phi}{v}} \quad (4)$$

This equation has been modified for wet steam flow through a sharp-edged orifice and can be expressed as:

$$W = \frac{358.927 C_o d^2 Y F_a}{\sqrt{1 - \left(\frac{d}{D}\right)^4}} \sqrt{\frac{\phi}{X^{1.354}(v_g - v_f) + v_f}} \quad (5)$$

In the above equations, $C_o$ is the discharge coefficient; d is the diameter of the orifice plate (14); Y is the vapor expansion factor; $F_a$ is a temperature correction factor; $\phi$ is the differential pressure; D is the inside diameter of the meter run; v is the single phase specific volume; X is the steam quality; $v_f$ and $v_g$ are the specific volumes of saturated water and steam at pressure $P_1$ respectively.

For steam quality greater than 10%, the specific volume or the water $v_f$ is small relative to the specific volume of the steam, $v_g$ and can therefore, be neglected if one restricts the range of the device for measuring steam quality from 10% to 100%. For steam it has been determined that the specific volume of steam, at pressures between 100 and 1,000 psia, could be determined from $$v_g = \frac{C_1}{P^{C_2}} \quad (6)$$

| $C_1$ | $C_2$ | P (Psia) |
|---|---|---|
| 376.204 | 0.9640 | 100–300 |
| 486.340 | 1.0090 | 300–700 |
| 783.514 | 1.0817 | 700–1000 |

Substituting equation (6) into equation (5) and assuming is small relative to $v_g$ gives $$W = \frac{358.927 C_o d^2 Y F_a}{\sqrt{C_1 \left(1 - \left[\frac{d}{D}\right]^4\right)}} \sqrt{\frac{\phi P^{C_3}}{X^{1.354}}} \quad (7)$$

This equation expresses mass flow rate through a sharp-edged orifice for pressurized wet steam from 300–1,000 psia, and steam quality between 10% and 100%. Equation (7) can be written for higher pressure ranges by using appropriate expressions for $C_1$ and $C_2$. There are now at issue, two algebraically simple expressions relating mass flow rate and steam quality through the critical venturi 16 with equation (3), and through the orifice plate 14 with equation (7).

SIMULTANEOUS SOLUTIONS OF EQUATIONS

Substituting equation (3) into equation (7) and solving for steam quality, gives expressions for steam quality and mass flow rate through the device as $$X = \left(\frac{1.2882859 \times 10^5 c_o^2 \left(\frac{d}{c}\right)^4 Y^2 \phi F_a}{C_1 a^2 \left[1 - \left(\frac{d}{D}\right)^4\right] P^{(2-c_2)}}\right)^{\frac{1}{1.354-2b}} \quad (8)$$

and $$W = a \frac{c^2 P}{X^b} \quad (9)$$

where a and b must be determined from experiments. The vapor expansion factor Y can be approximated as 1.

Equations (8) and (9) are valid only when the venturi is in critical flow.

TEST DATA OF DEVICE

In a laboratory test of a device consisting of an orifice in series with a critical flow venturi, the following constants were determined:

$a = 39.0$ \quad (11a)

$b = 0.446$ \quad (11b)

$c_o = 0.60$ \quad (11c)

NOMENCLATURE

In the previous development of equations, the following terms apply:

a = Empirical constant in equation (3) (dimensionless)
b = Empirical constant in equation (3) (dimensionless)
c Venturi throat diameter (in.)
$C_o$ = Discharge coefficient of orifice plate (dimensionless)
$C_1, C_2$ = Coefficient in equation (5)
d = Diameter of orifice plate (in.)
D = Inside diameter of orifice plate (in.)
Fa = Temperature correction factor (in./in. —F°)
G* = Critical mass velocity in venturi (lbm/ft²-sec)
P = Absolute pressure upstream of venturi (psia)
P* = Absolute pressure at location 29 during critical flow (psia)
W = Mass flow rate through device (lbm/hr)
$W_{min}$ = Minimum recommended mass flow rate through device (lbm/hr)
X = No slip steam quality upstream of venturi (fraction)
Y = Steam vapor expansion factor (dimensionless)
$\phi$ = Differential pressure across the orifice (in. of water)
$v_f$ = Specific volume of saturated water at P(ft³/lbm)
$v_g$ = Specific volume of saturated steam at P(ft³/lbm)
$v$ = Specific volume of the single phase fluid at the flowing temperature and pressure (ft³/lbm)

It is understood that although modifications and variations of the invention can be made without departing from the spirit and scope thereof, only such limitations should be imposed as are indicated in the appended claims.

PUBLICATIONS REFERRED TO

1. Hawkins, G. A.: Thermal Properties of Substances and Thermodynamics, "Mark's Standard Handbook for Mech. Eng., Eighth Edition, pp. 4.46–4.49.
2. Crocker, S. and King, R. C.: Piping Handbook, Section 3, McGraw-Hill, New York, 1967, pp. 3–59.
3. Miller, R. W.: Flow Measurement and Engineering Handbook, McGraw-Hill Book Company, New York, 1983, pp. 9.92
4. Brittan, Charles L.: "Sonic Nozzles" presented at Appalachian Gas Measurement Short Course West Virginia university, Morgantown, W. V., Aug. 12–14, 1975.

What is claimed is:

1. Apparatus for monitoring and indicating conditions of flow of steam from a pressurized source thereof, to determine the steam's quality and rate of flow without substantially reducing the pressure of the steam as a result of its passing through said apparatus, which apparatus includes:

conduit means communicated with said pressurized source of steam for receiving a flow therefrom;
an orifice plate in said conduit means;
a venturi in said conduit means spaced downstream from the orifice plate to define an intermediate chamber therebetween;
said venturi having a multi-segment axial passage for conducting said flow of steam, defined by an inlet segment which opens into a constricted throat, which in turn opens into a diverging wall segment having an internal angle of approximately 3° to 10°;
said multi-segment passage being contoured to provide the flow of steam passing therethrough with critical flow characteristics;
first sensing means communicated with said intermediate chamber for indicating steam pressure therein;

second sensing means communicated with said intermediate chamber and said conduit means upstream of said orifice plate for indicating the steam pressure differential across said orifice plate; and third sensing means communicated with said axial passage for indicating steam pressure downstream of said inlet segment.

2. In the apparatus as defined in claim 1 wherein the said inlet segment is formed by a progressively converging wall, said outwardly diverging wall segment defines an included angle of between 3° and 10°, and the overall length of said venturi is in the range of 6 to 10 inches.

3. An apparatus for concurrently determining the mass flow rate and the quality of pressurized steam flowing through a conduit at a sufficient velocity to be at critical flow conditions, which comprises:

an orifice plate disposed transversely of said conduit;

a critical flow venturi in said conduit spaced downstream of said orifice plate to define an intermediate chamber therebetween;

means for measuring the pressure differential across said orifice plate;

means for measuring the pressure in said intermediate chamber; and means for determining mass flow rate and the quality of the steam flowing through said conduit as a function of said indicated pressure differential across said plate and the pressure in said intermediate passage respectively in accordance with the following equations:

$$X = \left( \frac{1.2882859 \times 10^5 C_o^2 \left(\frac{d}{c}\right)^4 Y^2 \phi F_a^2}{C_1 a^2 \left[1 - \left(\frac{d}{D}\right)^4\right] P^{(2-C_2)}} \right)^{\frac{1}{1.354 - 2b}}$$

and $$W = a \frac{C^2 P}{X_b}$$

wherein
 a = 39.0
 b = 0.446
 $C_o$ = 0.60
 d = diameter of orifice plate (inches)
 c = Venturi throat diameter
 Y = steam vapor expansion factor
 $\phi$ = differential pressure across the orifice (inches of water)
 $F_a$ = temperature coefficient factor (in./°F.)
 $C_1, C_2$ = coefficients
 D = inside diameter of meter
 P = absolute pressure upstream of the venturi (psia)
 X = steam quality
 W = mass flow rate

* * * * *